(12) United States Patent
Nave et al.

(10) Patent No.: US 11,127,430 B1
(45) Date of Patent: Sep. 21, 2021

(54) ROBOTIC CONFIRMATION OF COLUMN STRAIGHTNESS

(71) Applicant: International Business Machines Corporation, Armonk, NY (US)

(72) Inventors: Shawn M. Nave, Tucson, AZ (US); Ronald Faye Hill, Jr., Tucson, AZ (US); Luis Roberto Macias, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/823,217

(22) Filed: Mar. 18, 2020

(51) Int. Cl.
*G11B 15/68* (2006.01)

(52) U.S. Cl.
CPC ........ *G11B 15/689* (2013.01); *G11B 15/6895* (2013.01)

(58) Field of Classification Search
None
See application file for complete search history.

(56) References Cited

U.S. PATENT DOCUMENTS

| | | | |
|---|---|---|---|
| 4,864,438 | A | 9/1989 | Munro |
| 4,908,777 | A | 3/1990 | Wolfe |
| 6,574,529 | B1 | 6/2003 | Lundeen et al. |
| 7,110,910 | B1 | 9/2006 | Deffenbaugh et al. |
| 7,117,068 | B2 | 10/2006 | Critchlow |
| 7,472,029 | B2 | 12/2008 | Pierce |

FOREIGN PATENT DOCUMENTS

EP 3093611 A2 11/2016

OTHER PUBLICATIONS

Chang et al., "Teach Mastering Process for an Automated Tape Library," IP.com Prior Art Database, Technical Disclosure No. IPCOM000105192D, Mar. 19, 2005, 5 pages.
Yu et al., "Positioning, Navigation, and Book Accessing/Returning in an Autonomous Library Robot using Integrated Binocular Vision and QR Code Identification Systems," Sensors, vol. 19, 2019, pp. 1-26.
Dai et al., "Planning Jerk-Optimized Trajectory with Discrete Time Constraints for Redundant Robots," IEEE Transactions on Automation Science and Engineering, 2020, pp. 1-14.

*Primary Examiner* — Craig A. Renner
(74) *Attorney, Agent, or Firm* — Zilka-Kotab, P.C.

(57) ABSTRACT

A computer-implemented method includes identifying a lower calibration target of a column of an automated tape library and identifying an upper calibration target of the column. The method includes calculating at least one slot position between the upper calibration target and the lower calibration target. For at least some of the calculated slot positions, the method includes performing a check including identifying an actual slot position corresponding to the calculated slot position. The actual slot position is located by a robotic accessor. The method includes comparing the calculated slot position to the corresponding identified actual slot position and determining whether the calculated slot position is within a predefined range of the corresponding identified actual slot position. The method includes outputting a result of the determination.

20 Claims, 14 Drawing Sheets

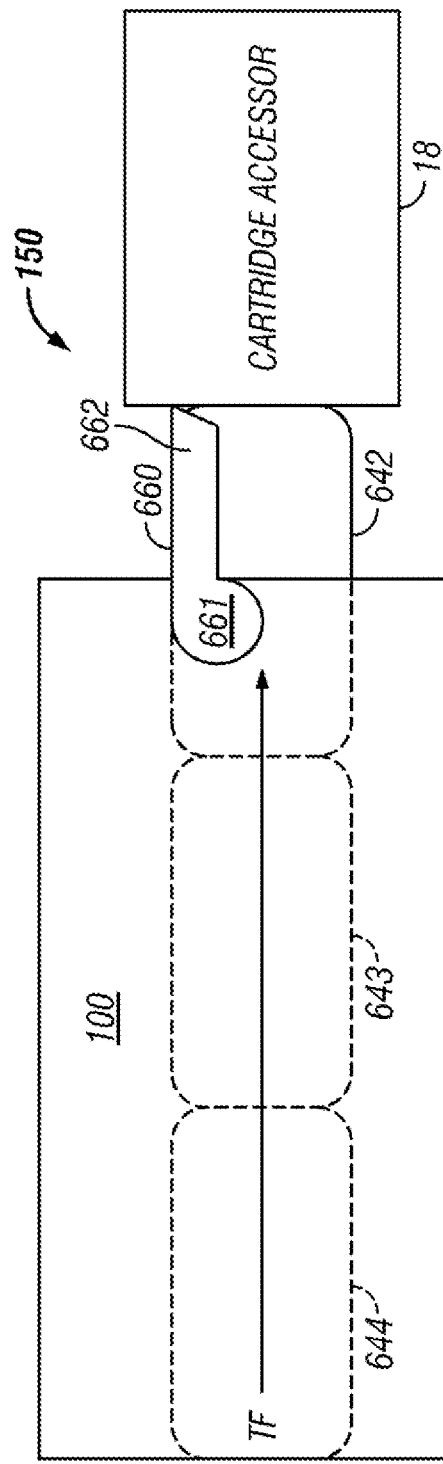
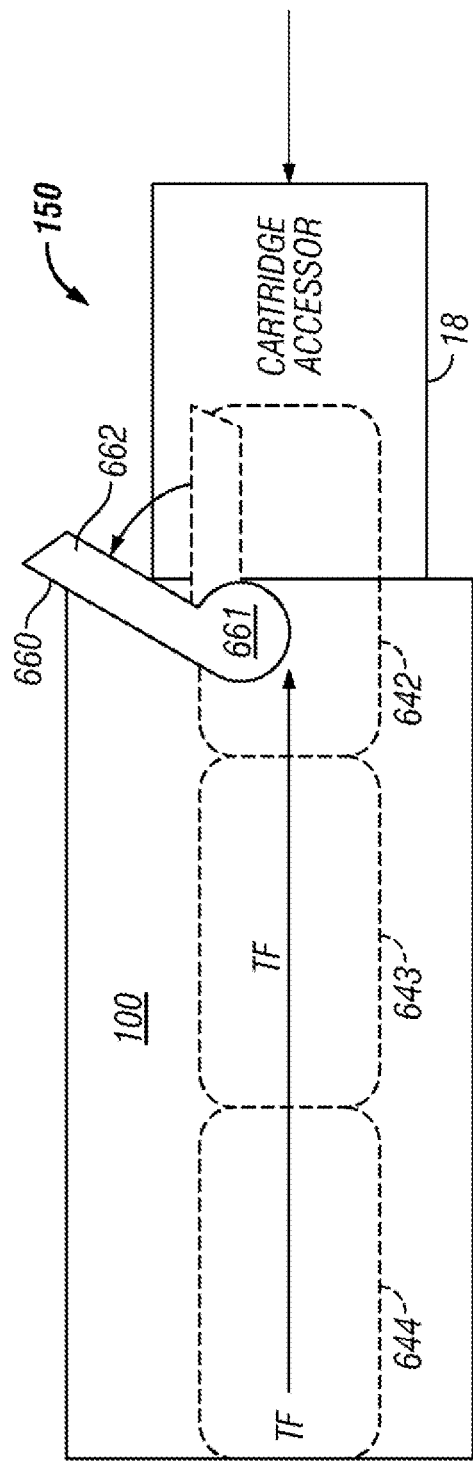
FIG. 8A
FIG. 8B

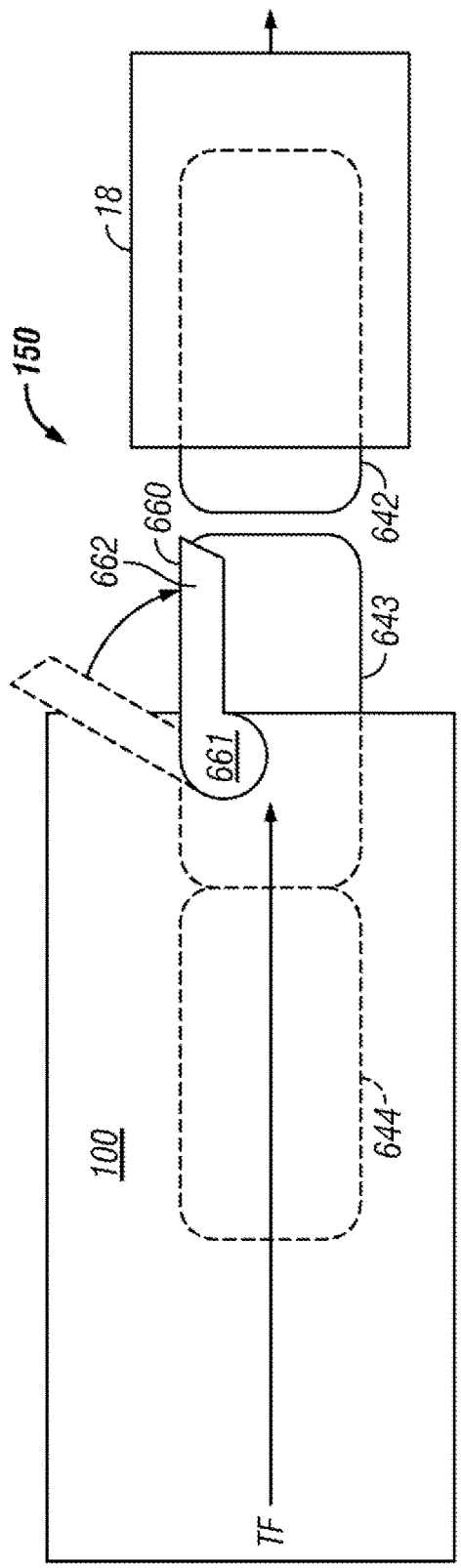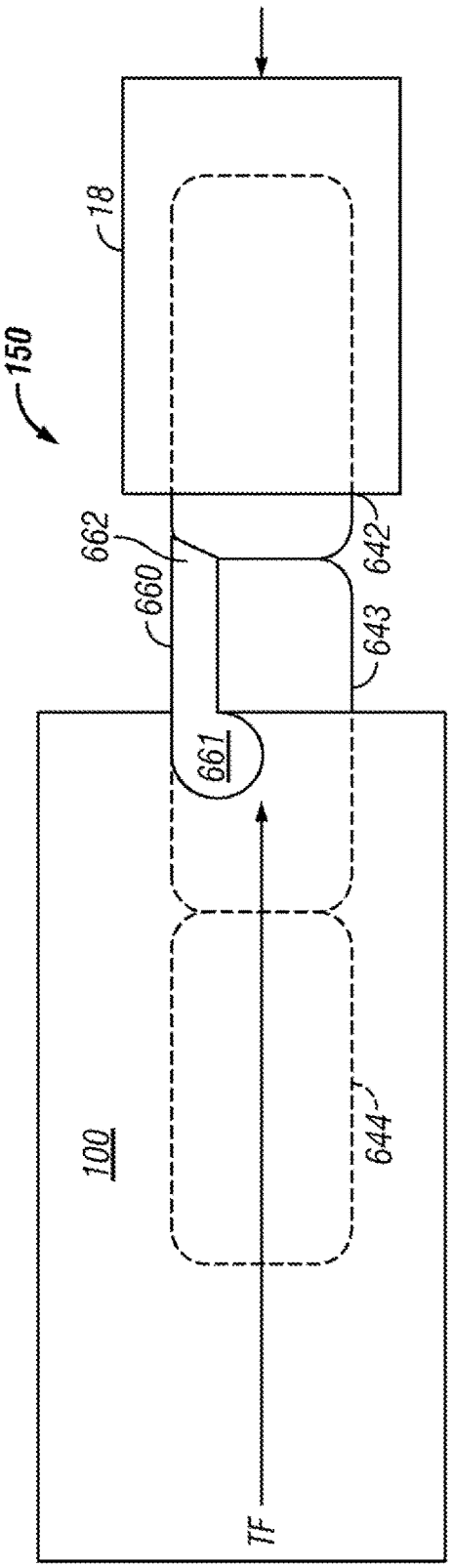
FIG. 8C
FIG. 8D

ROBOTIC CONFIRMATION OF COLUMN STRAIGHTNESS

BACKGROUND

The present invention relates to data storage systems, and more particularly, this invention relates to robotic confirmation of column straightness in automated tape libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated tape library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Components of automated tape libraries (e.g., columns within the automated tape library, frames, storage doors, vertical masts of robotic accessors, etc.) may comprise manufacturing defects and/or may be damaged during shipping or installation. These defects and/or damage may contribute to decreased functionality of the automated tape library, especially with respect to robotic accessor(s) operating within the automated tape library.

SUMMARY

A computer-implemented method, according to one embodiment, includes identifying a lower calibration target of a column of an automated tape library and identifying an upper calibration target of the column. The method includes calculating at least one slot position between the upper calibration target and the lower calibration target. For at least some of the calculated slot positions, the method includes performing a check including identifying an actual slot position corresponding to the calculated slot position. The actual slot position is located by a robotic accessor. The method includes comparing the calculated slot position to the corresponding identified actual slot position and determining whether the calculated slot position is within a predefined range of the corresponding identified actual slot position. The method includes outputting a result of the determination.

A system, according to another embodiment, includes a processor and logic integrated with the processor, executable by the processor, or integrated with and executable by the processor. The logic is configured to perform the foregoing method.

A computer program product, according to yet another embodiment, includes one or more computer readable storage media, and program instructions collectively stored on the one or more computer readable storage media. The program instructions include program instructions to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes identifying a lower calibration target of a column of an automated tape library and identifying an upper calibration target of the column. The method includes calculating at least one slot position between the upper calibration target and the lower calibration target. For at least some of the calculated slot positions, the method includes performing a check including identifying an actual slot position corresponding to the calculated slot position. The actual slot position is located by a robotic accessor. The method includes comparing the calculated slot position to the corresponding identified actual slot position and determining whether the calculated slot position is within a predefined range of the corresponding identified actual slot position. The method includes outputting a result of the determination.

In another general embodiment, a system includes a processor and logic integrated with the processor, executable by the processor, or integrated with and executable by the processor. The logic is configured to perform the foregoing method.

In another general embodiment, a computer program product includes one or more computer readable storage media, and program instructions collectively stored on the one or more computer readable storage media. The program instructions include program instructions to perform the foregoing method.

Figure 1:
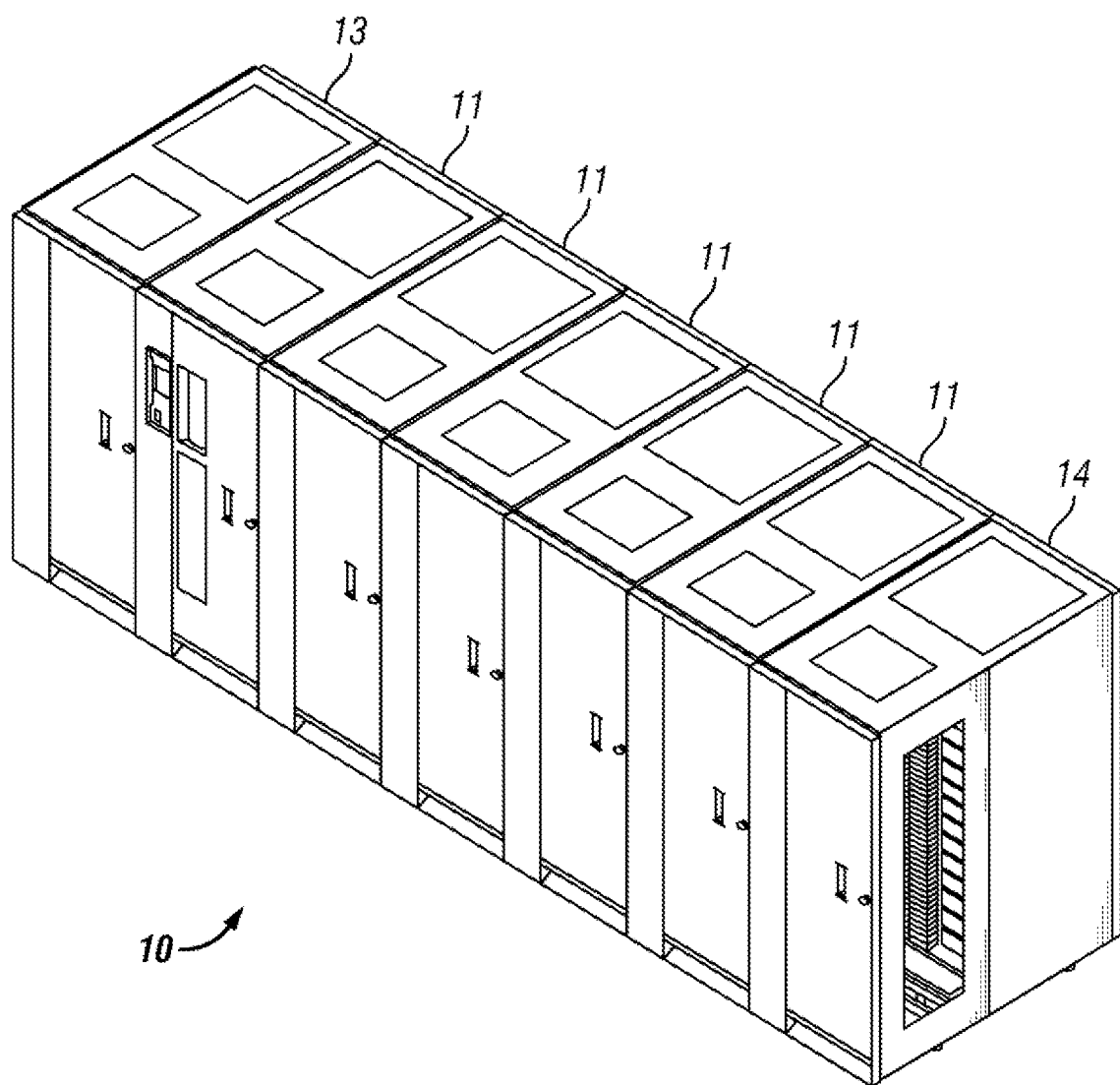
FIG. 1 is a perspective view of an automated data storage library according to one embodiment.
Figure 2:
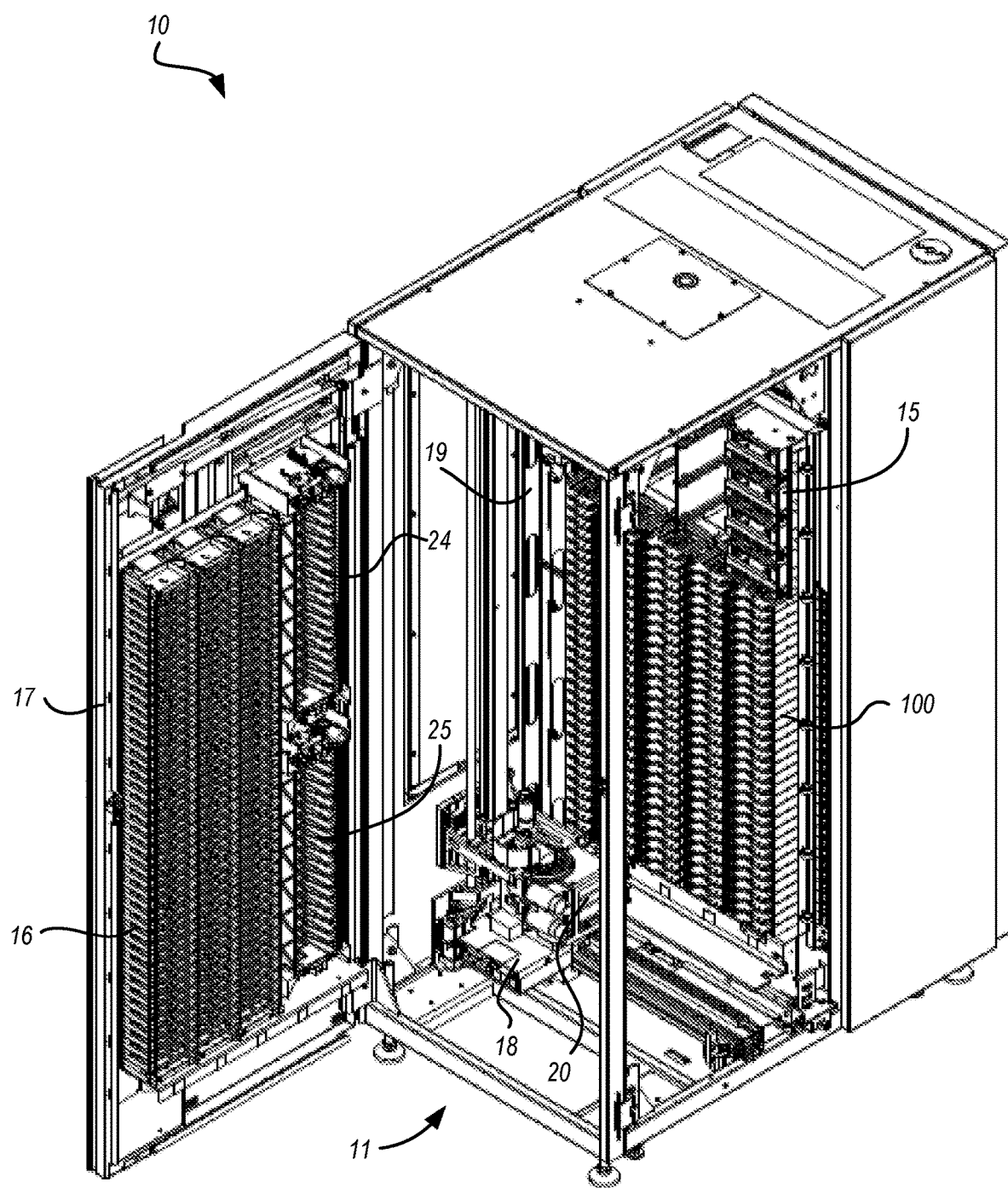
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library (IBM and all IBM-based trademarks and logos are trademarks or registered trademarks of International Business Machines Corporation and/or its affiliates). Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
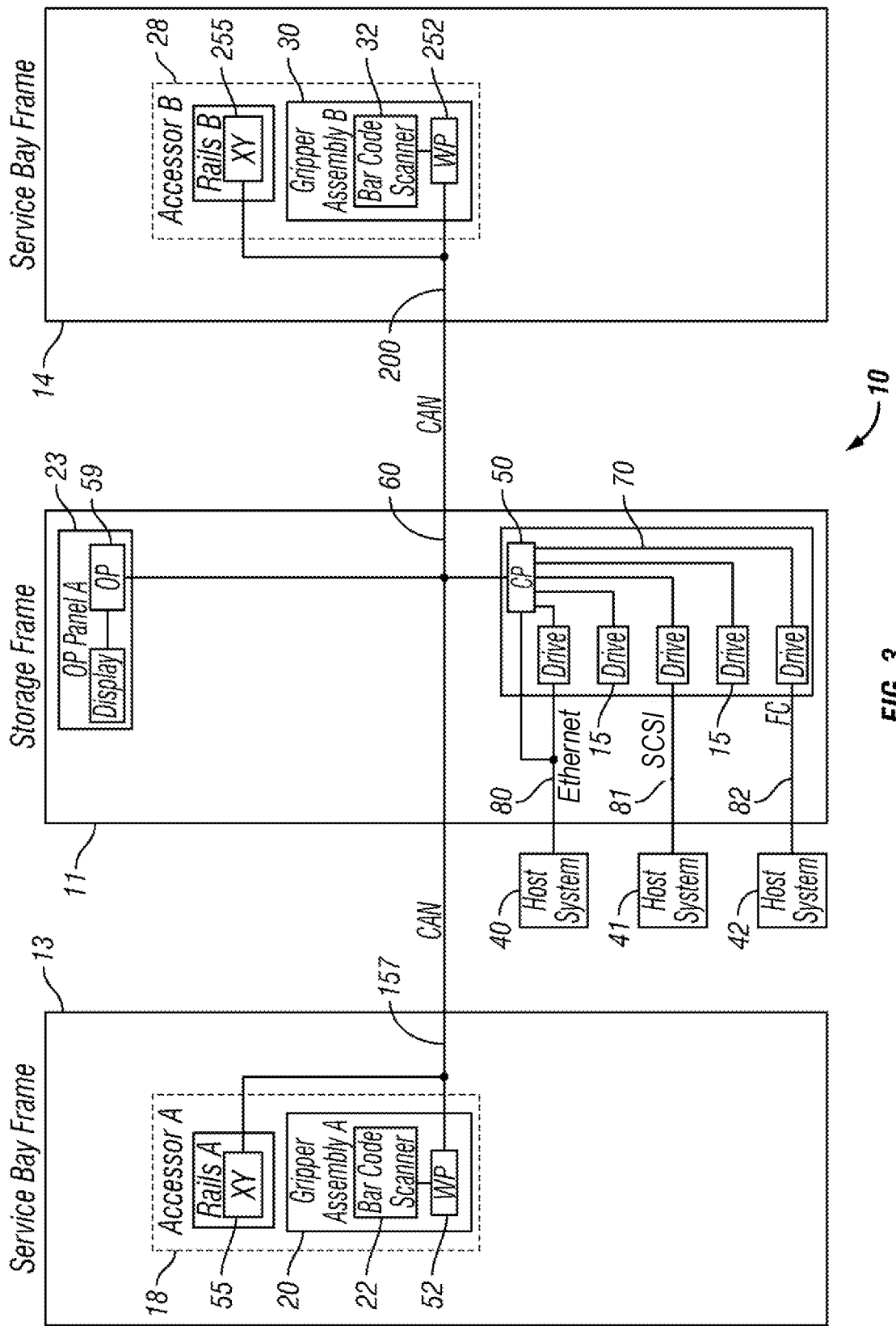
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner 22 (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42.

Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
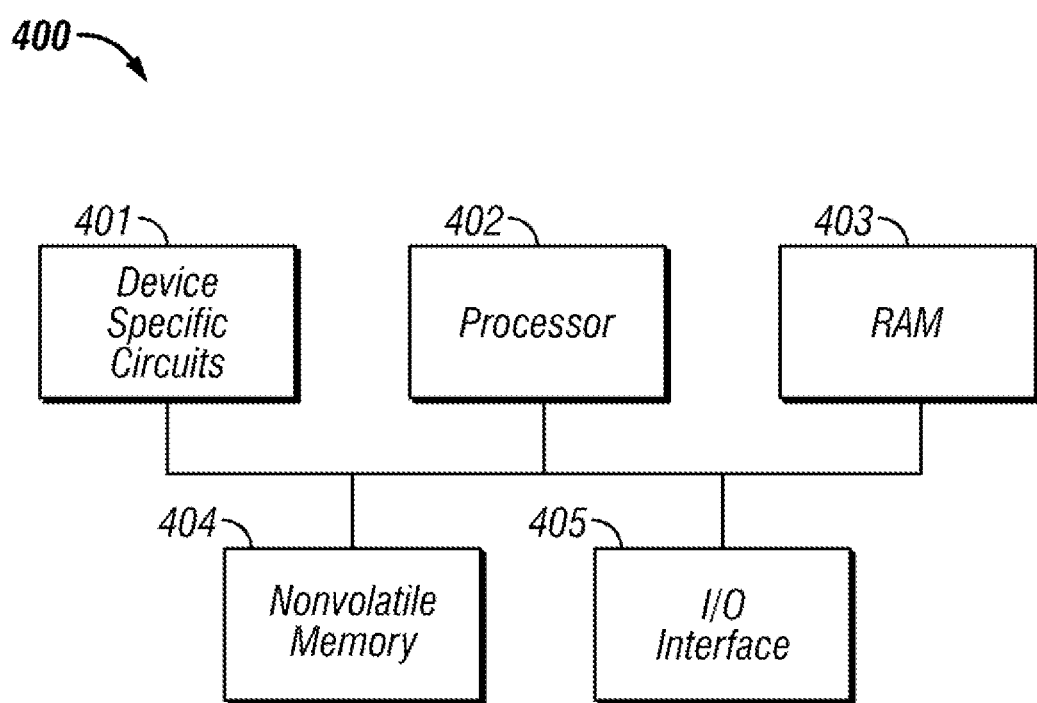
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
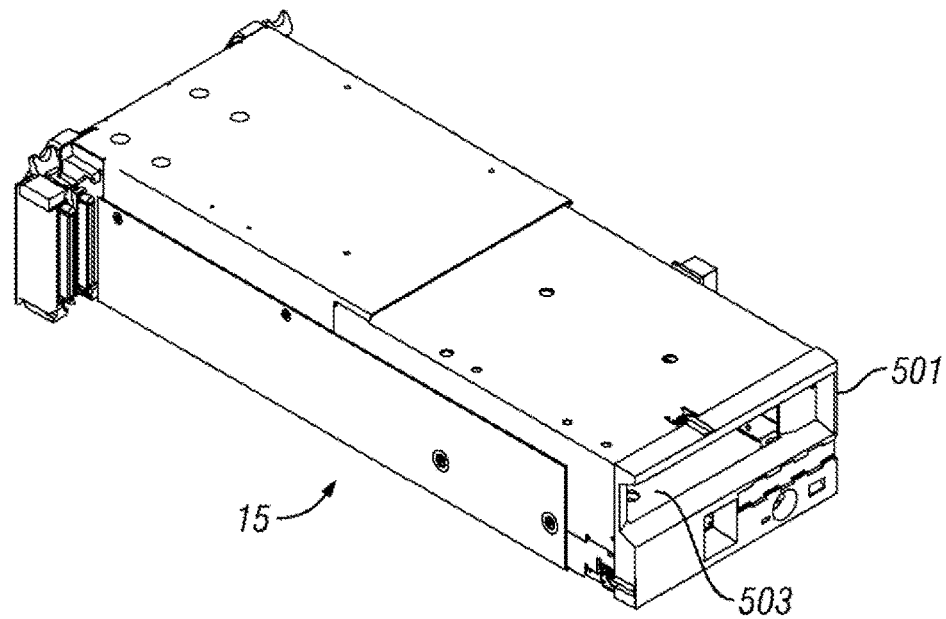
FIG. 5A is a front perspective view of a data storage drive according to one embodiment.
Figure 5B:
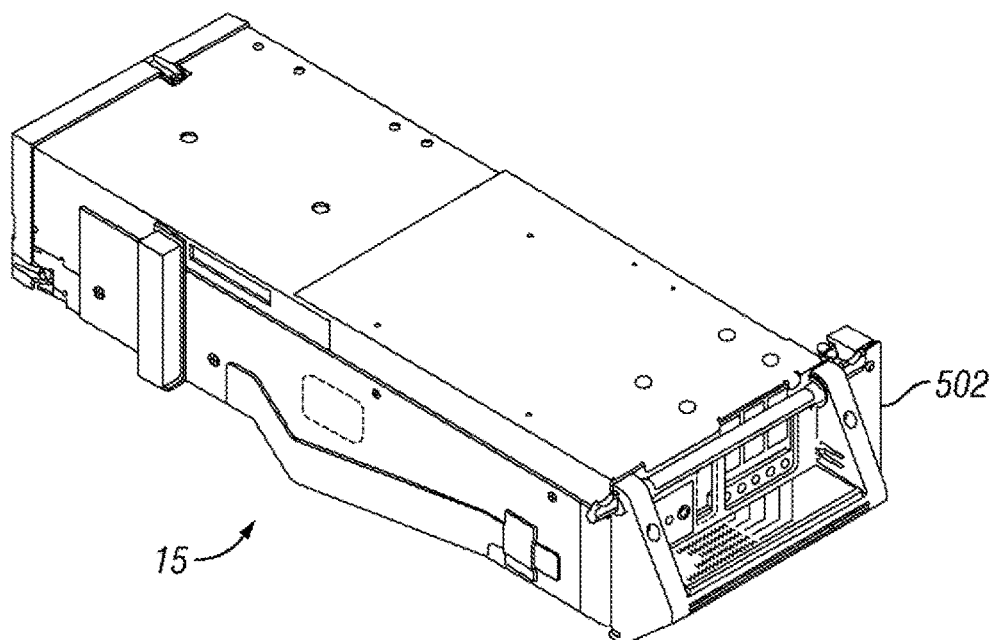
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
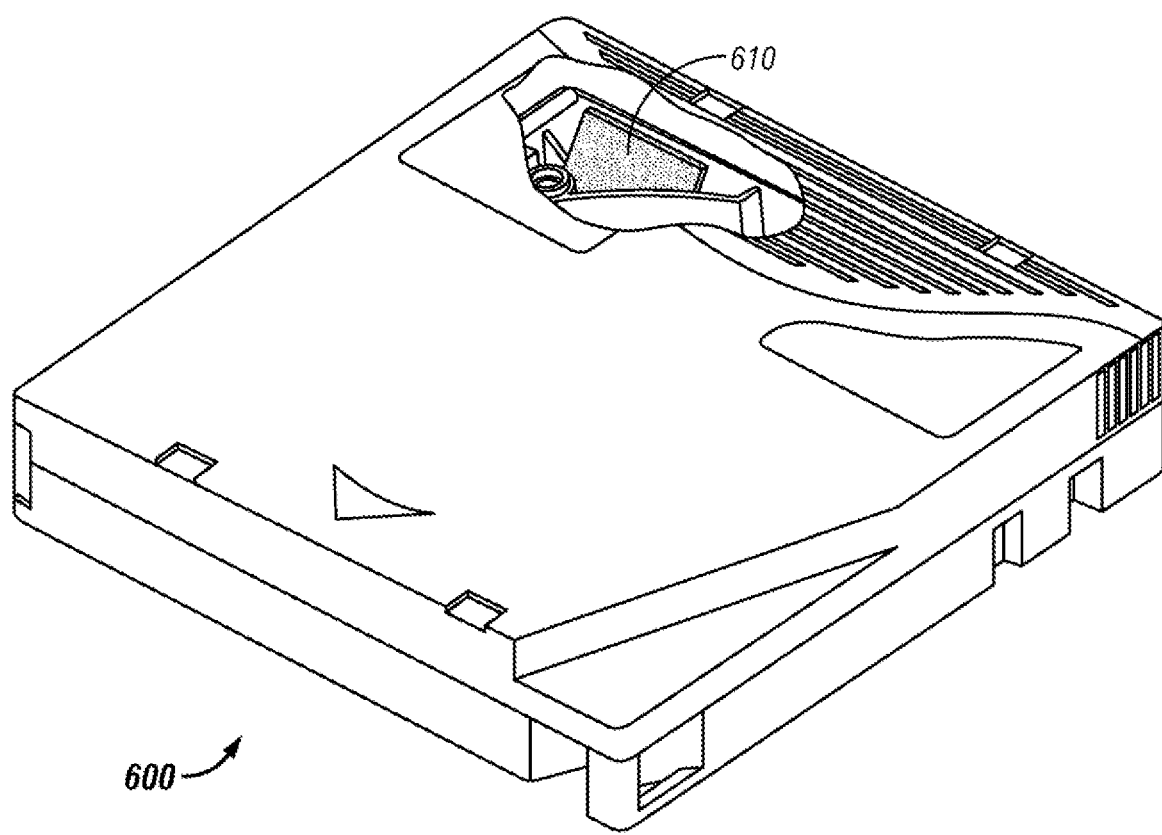
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 7A:
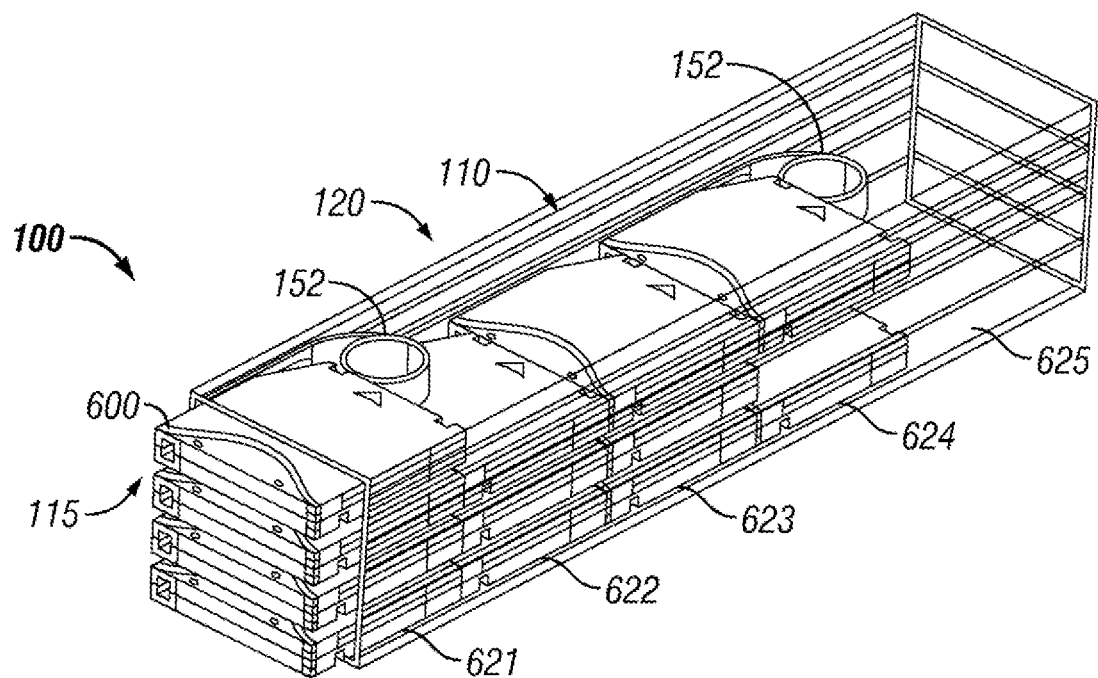
FIGS. 7A-7B are perspective views of a multi-cartridge deep slot cell according to one embodiment.
Figure 7B:
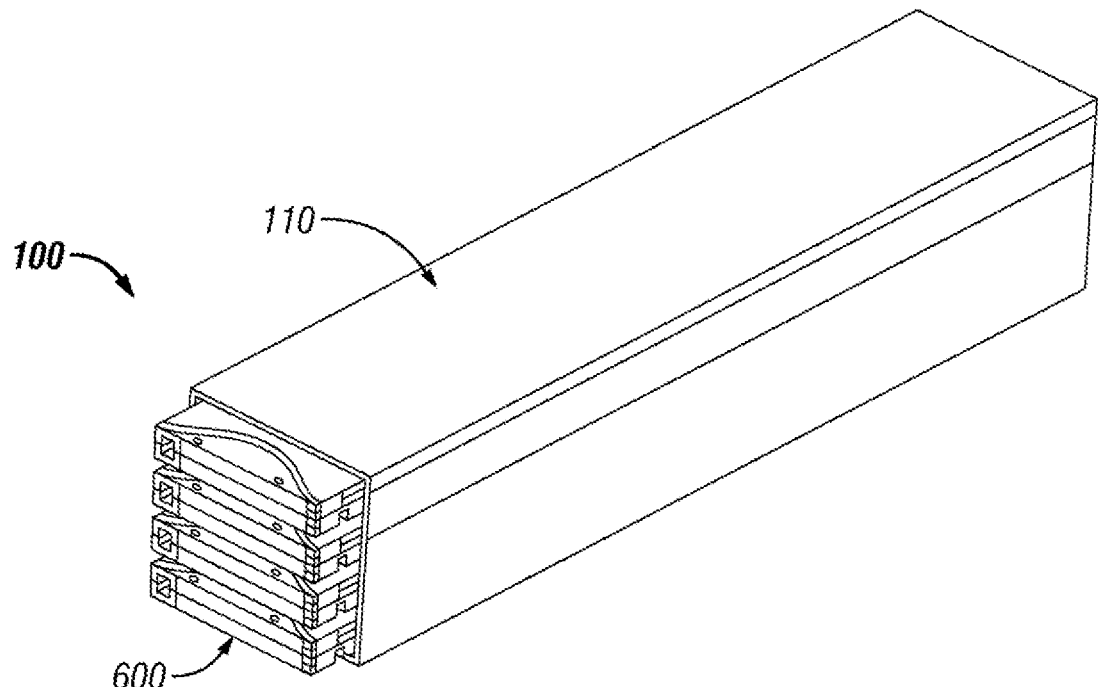

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
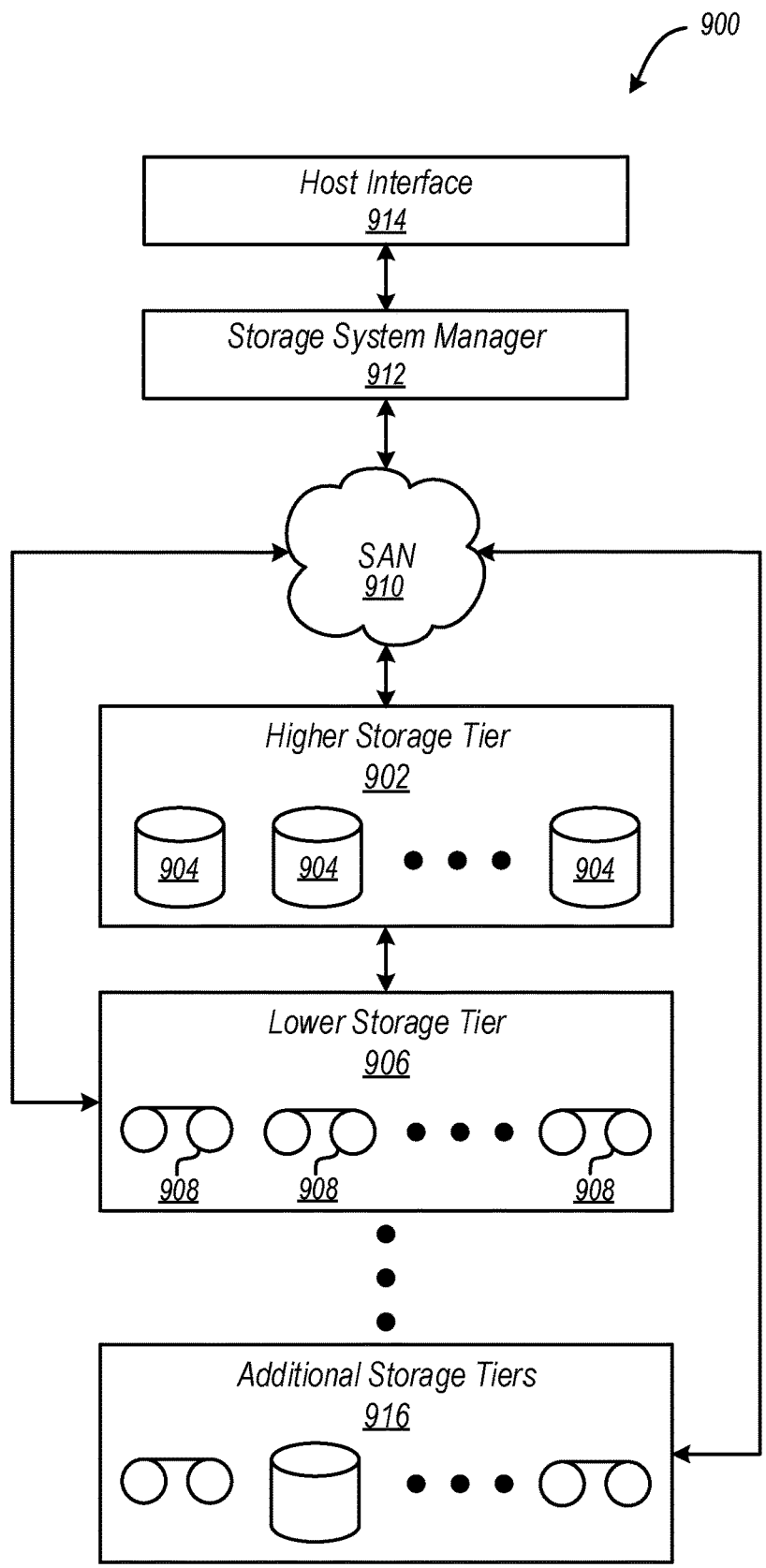
FIG. 9 is a depiction of a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Automated tape libraries are used in the storage industry for storing very large amounts of data at a low cost. Automated tape libraries comprise robotic accessors to move tape cartridges from storage slots to tape drives where the data is written to and/or read from the tape media within the tape cartridges. In order for the robotic accessor to reliably handle moving tape cartridges within the automated tape library (e.g., put and/or get tape cartridges), the robotic accessor positions itself accurately in front of the storage slots and/or tape drives in order to grab the tape cartridges. The robotic accessor positions itself in front of storage slots and/or tape drives in order to store the tape cartridges. If the robotic accessor is not accurately positioned, the tape cartridges are not able to be grabbed and/or, if the tape cartridges are grabbed, the tape cartridges may be dropped on the automated tape library floor (e.g., due to an improper grip). Accurate robotic accessor positioning is useful for efficient retrieval and use of tape cartridges stored in an automated tape library.

One conventional method for robotic accessor positioning include using motors with encoders to accurately position the robotic accessor in precise locations repeatedly within the tape library. For linear automated tape libraries, there is typically an X (e.g., horizontal) and Y (e.g., vertical) location grid in which the robotic accessor(s) move. For round and arcuate automated tape libraries, there is typically a theta (e.g., an angle) and Y (e.g., vertical) location grid in which the robotic accessor(s) move. Due to variances in construction of automated tape library structural components and robotic accessor components, library robotic accessors and/or other library robotics are calibrated and/or discover the various locations within the automated tape library where tape cartridges are stored and/or retrieved. In different automated tape libraries, conventional calibration processes include a sensor and/or a camera device mounted to the robotic accessors to detect a calibration target and record the position of the robotic accessor relative to the image of the calibration target.

In various conventional automated tape libraries, calibration targets are located throughout the automated tape libraries. For example, there are often calibration targets at the top and bottom of each column location of storage slots within the automated tape library. There are often calibration targets mounted to each tape drive and/or storage slot in addition to the calibration targets at the top and bottom of each column location. Some libraries, such as the IBM® TS4500 tape library, the StorageTek® PowderHorn® tape library, etc., comprise calibration targets on each and every storage slot and tape drive location within the tape library. It is extremely time consuming for the robotic accessor to calibrate every storage slot within the tape library and record the value of each storage slot. Calibrations for every storage slot take an undesirable amount of time.

Conventionally, during tape library calibrations, robotic accessors find and record only the topmost and bottommost calibration target locations and measurements for the other locations are subsequently calculated therefrom. For example, a common practice includes recording the top and bottom calibration target locations in each column of storage slots in an automated tape library, and subsequently calculating the location of each storage slot location between the top and bottom calibration targets. This conventional approach assumes that both the robotic accessor and the column of storage slots is completely straight (e.g., substantially perpendicular to a plane of the ground along an entire plane thereof). The vertical (Y) mast of the robotic accessor may not be straight. One or more of the structural frame members of the frame and/or the door may not be straight. In instances where any of the foregoing components are not straight, the calculated calibration position of storage slots in the column location are incorrect. When the robotic accessor attempts to grab and/or place tape cartridges in the storage slots, the robotic accessor is not configured for the optimal position. This less than optimal positioning results in mishandling and/or dropping of the tape cartridge.

As used throughout the present disclosure, column straightness refers to straightness associated with a vertical (Y) mast of the robotic accessor, a vertical (Y) axis of the structural frame members of the frame and/or the door, a vertical (Y) axis of any column within the data storage library, etc., or any combination thereof. Straightness may refer to an offset of a portion of the relevant component (e.g., frame, door, column, etc.) of the tape library from an expected or the actual vertical axis of the component, an offset of the vertical axis of the relevant component from normal to the floor supporting the tape library, etc. In various embodiments, a component which is considered straight has an offset that is less than or equal to 1 mm. In preferred embodiments, the offset of a straight component is less than or equal to 0.5 mm. A component which is not straight is characterized by an offset greater than 1 mm, greater than 2 mm, etc. Variances in straightness may be the result of manufacturing defects, shipping damage, etc., as would be understood by one having ordinary skill in the art.

It would be desirable to have a process to check for column straightness to allow the automated tape library to function and complete any calibration processes for the robotic accessors with the additional confidence that the calibration locations for the robotic accessor positioning are correct. Such a process allows the robotic accessor of the automated tape library to avoid mishandling of tape cartridges.

Various embodiments of the present disclosure use the robotic accessor within the tape library to perform a check for the straightness of a column and verify that the robotic accessor and/or the automated tape library structural components are within a specified straightness to avoid mishandling of tape cartridges by the robotic accessor. At least some embodiments perform the check at a manufacturing facility (e.g., to check for manufacturing defects). In other embodiments, the check may be performed before, during and/or after the installation of the automated tape library at its final destination to verify that no shipping damage occurred from when the automated tape library (e.g., components thereof) was shipped from the manufacturing facility to the customer's final location and/or to verify that no damage occurred during installation. In yet another approach, various embodiments of the check may be performed live (e.g., during normal library operations in the field of operation of the automated tape library) to check for straightness and/or to detect degradation of library components over the lifespan of the product.

Figure 10:
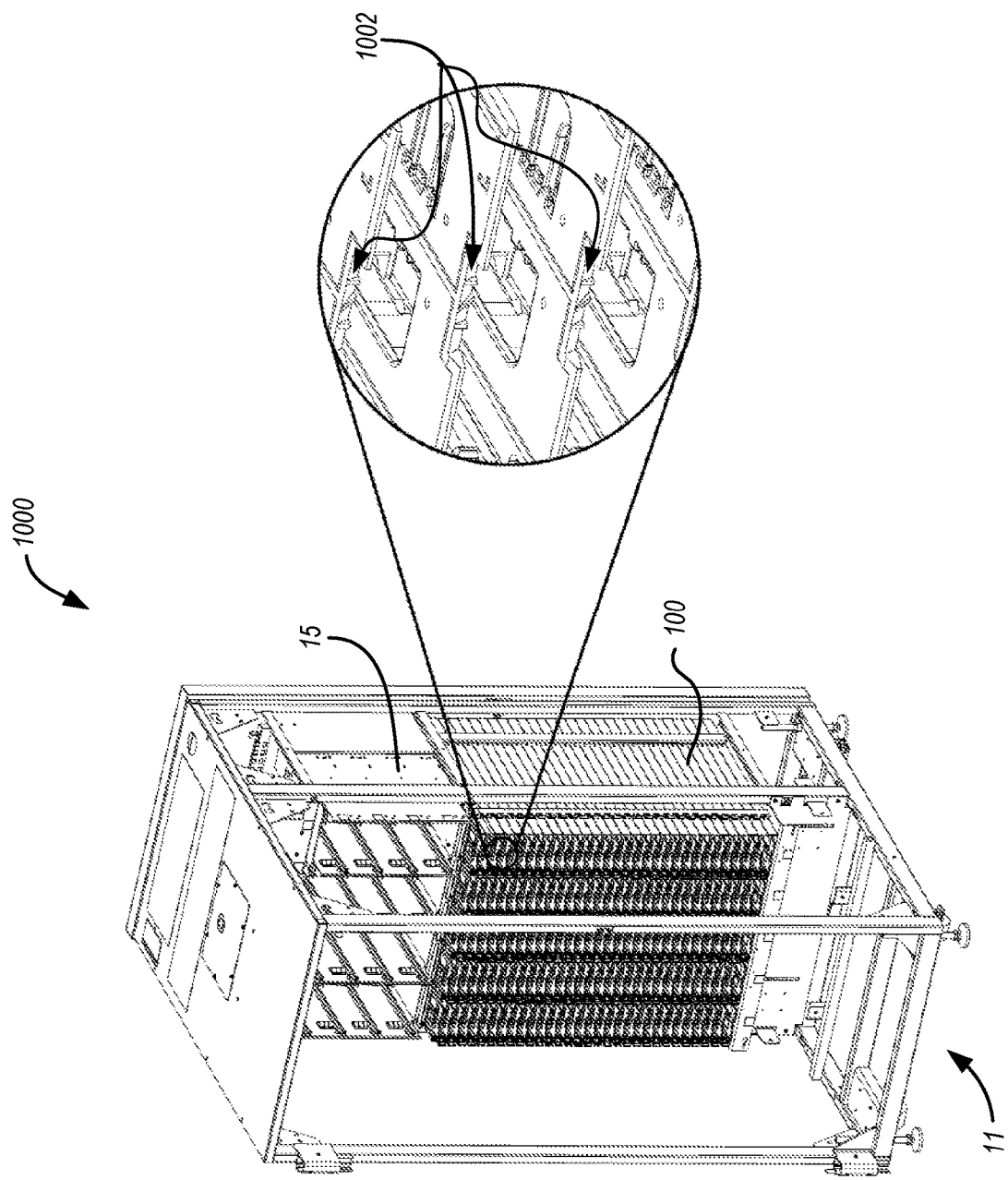
FIG. 10 is a perspective view of a storage frame in a data storage library having calibration targets, in accordance with one embodiment of the present invention.

FIG. 10 depicts a data storage frame 1000, in accordance with one embodiment. As an option, the present data storage frame 1000 may be implemented in conjunction with features from any other embodiment listed herein, such as those described with reference to the other FIGS. Of course, however, such data storage frame 1000 and others presented herein may be used in various applications and/or in permutations which may or may not be specifically described in the illustrative embodiments listed herein. Further, the data storage frame 1000 presented herein may be used in any desired environment.

The data storage frame 1000 is a singular frame within the automated tape library. As described in detail above, a typical method for library calibration by the robotic accessor (not shown) includes identifying the top and bottom calibration targets of each column of storage slots within an automated tape library and calculating the storage locations of each slot within that column, assuming that the column within the automated tape library is straight. As also mentioned above, in some automated tape libraries, each and every storage slot has its own calibration target. As shown, the data storage frame 1000 includes calibration targets 1002. The calibration targets 1002 are "N" shaped features molded into each storage slot although calibration targets as described throughout the present disclosure may be of any variety known in the art.

A calibration sensor (not shown) may be mounted to the robotic accessor (not shown) and is capable of reading a calibration target via methods known in the art including via a camera, a 2D imager, a barcode scanner, etc. Upon reading the calibration target, the robotic accessor records its own (X, Y) position and where the image is recorded to determine the actual, physical (X, Y) location of the calibration target. The robotic accessor may use the actual, physical position location to determine where to pick up and/or place tape cartridges within the slots and/or drives on which the calibration target is mounted according to the various embodiments of the present disclosure.

Figure 11:
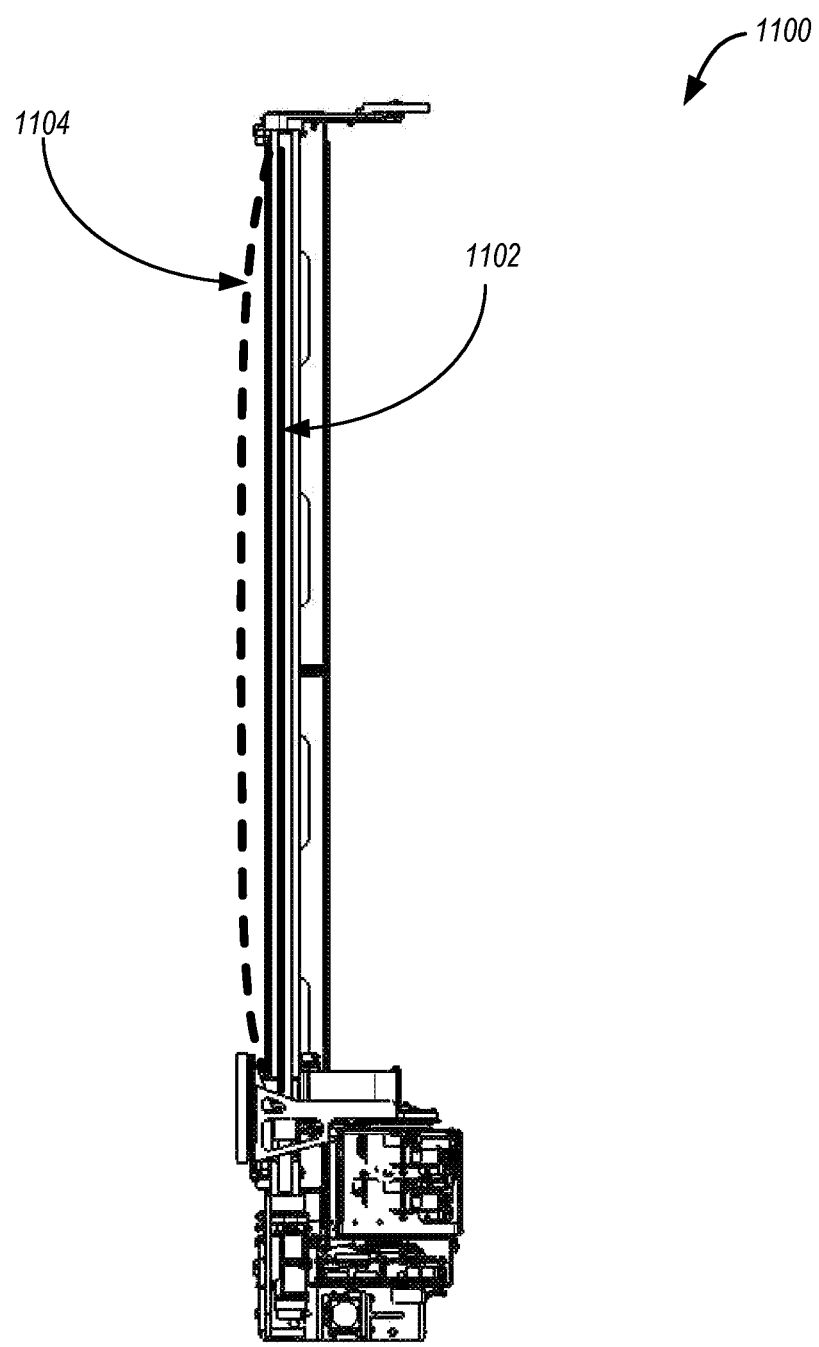
FIG. 11 is a front view of a robotic accessor, in accordance with one embodiment of the present invention.

FIG. 11 depicts a robotic accessor 1100, in accordance with one embodiment. As an option, the present robotic accessor 1100 may be implemented in conjunction with features from any other embodiment listed herein, such as those described with reference to the other FIGS. Of course, however, such robotic accessor 1100 and others presented herein may be used in various applications and/or in permutations which may or may not be specifically described in the illustrative embodiments listed herein. Further, the robotic accessor 1100 presented herein may be used in any desired environment.

In some instances, due to manufacturing defects and/or shipping damage, the vertical mast of the robotic accessor may be bent and not straight. As referred to throughout the present disclosure, bent and deformed may be used interchangeably to refer to any portion of the relevant component which is not substantially straight. The robotic accessor 1100 preferably includes a straight vertical mast 1102. The robotic accessor 1100 may alternatively include a bent vertical mast 1104, exemplified in exaggerated form by the dashed line. If a robotic accessor with a bent vertical mast calibrates a top storage slot calibration target and a bottom storage slot calibration target, and subsequently calculates the position of all storage slots located in between these two calibration positions under the assumption that the vertical mast is straight, when the robotic accessor tries to grab and/or place a tape cartridge in the middle storage slots of the column (e.g., comprising the top calibration target and the bottom calibration target), the robotic accessor is not in the correct position to properly access the tape cartridge.

Figure 12B:
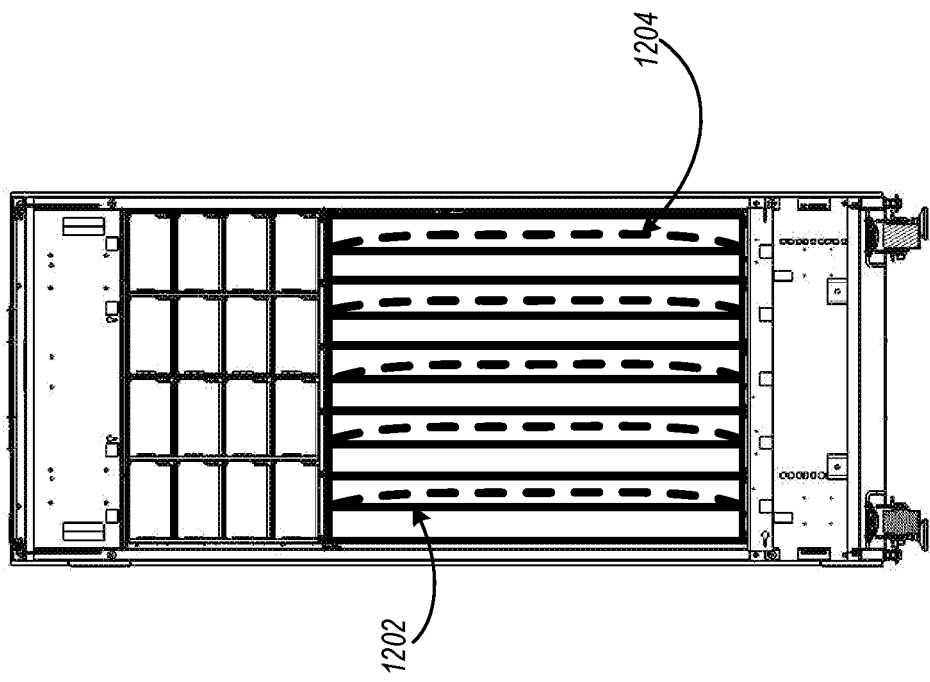
FIG. 12B is a front view of drive side storage slots in a data storage library, in accordance with one embodiment of the present invention.
Figure 12A:
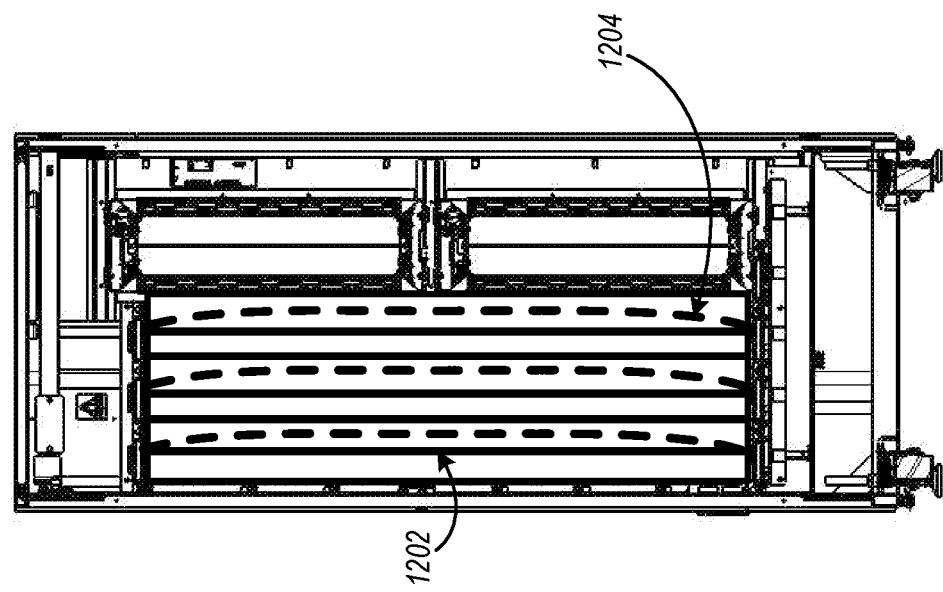
FIG. 12A is a front view of door side storage slots in a data storage library, in accordance with one embodiment of the present invention.

FIG. 12A depicts door side storage slots in a data storage library and FIG. 12B depicts drive side storage slots in a data storage library in accordance with one embodiment. As an option, the present storage slots may be implemented in conjunction with features from any other embodiment listed herein, such as those described with reference to the other FIGS. Of course, however, such storage slots presented herein may be used in various applications and/or in permutations which may or may not be specifically described in the illustrative embodiments listed herein. Further, the storage slots presented herein may be used in any desired environment.

In various instances, the vertical mast of a robotic accessor in a data storage library is straight and the data storage library framework and/or door supports which hold the storage slots are bent (e.g., not straight). For example, the axis 1202 of at least one column (e.g., or single side of a column) for storage slots in a data storage library may be straight. Alternatively, the axis 1204 of at least one column (e.g., or single side of a column) for storage slots in a data storage library may be bent, as exemplified by the exaggerated dashed line.

A bent component is problematic, because, for example, if the data storage library framework and/or door supports which hold the storage slots are bent, and a robotic accessor calibrates a top storage slot calibration target and a bottom storage slot calibration target of a column in the data storage library, and merely calculates the position of all storage slots located in between these two calibration targets under the assumption that the data storage library framework and/or door supports are straight, when the robotic accessor tries to grab and/or place a tape cartridge in the middle storage slots of the column (e.g., comprising the top calibration target and the bottom calibration target), the robotic accessor is not in the correct position to properly access the tape cartridge. A single column may not be straight or a plurality of columns in a frame may not be straight, as shown in FIGS. 12A and 12B.

Figure 13:
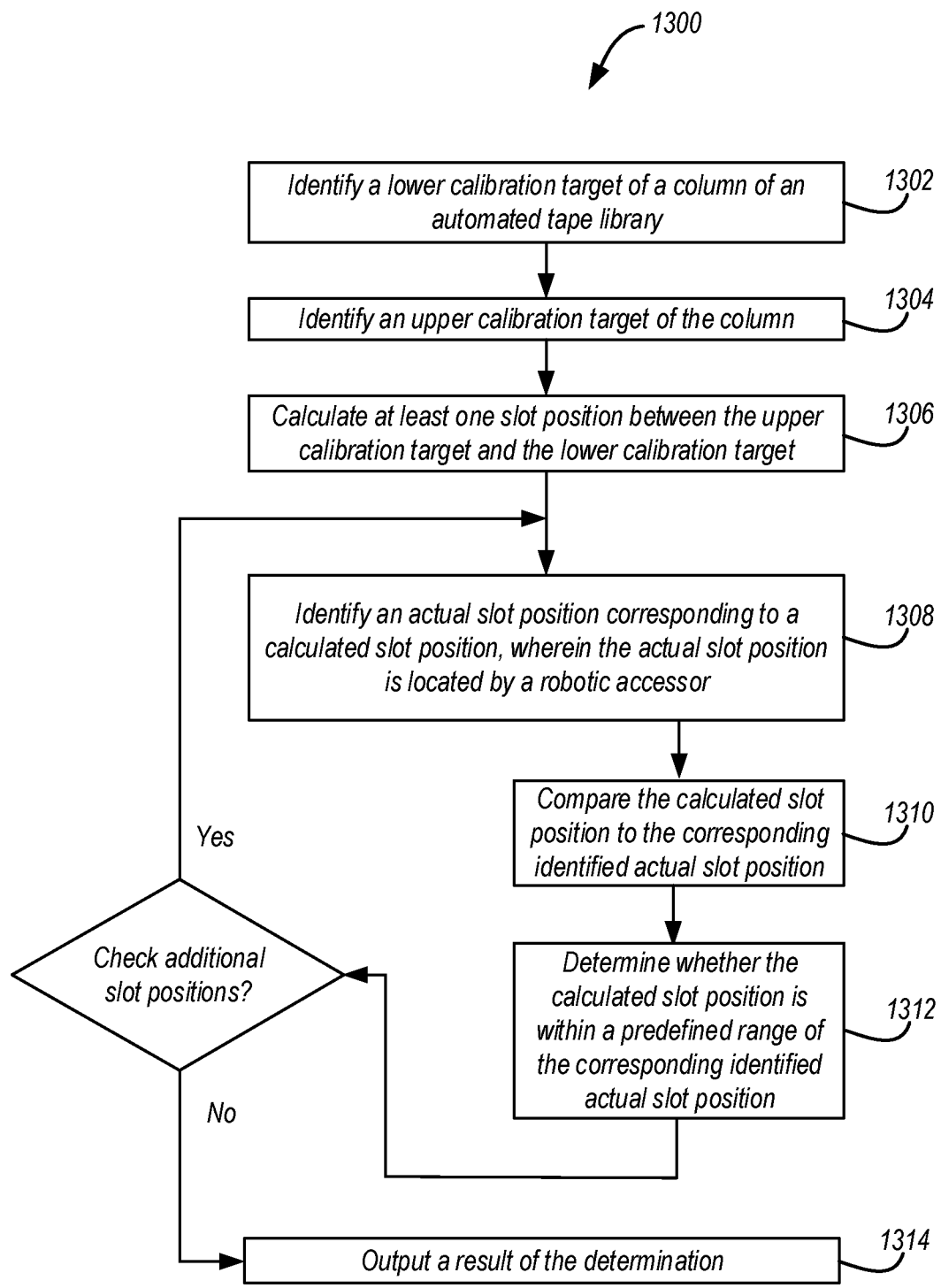
FIG. 13 is a flowchart of a method, in accordance with one embodiment of the present invention.

Now referring to FIG. 13, a flowchart of a method 1300 is shown according to one embodiment. The method 1300 may be performed in accordance with the present invention in any of the environments depicted in FIGS. 1-12B, among others, in various embodiments. Of course, more or fewer operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by robotic accessors, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

In preferred embodiments, method 1300 confirms the straightness of at least one column in an automated tape library. In response to determining that the column in not straight, an alert may be generated and/or output in order to remedy or replace components which are not straight, according to any of the embodiments described in detail below.

As shown in FIG. 13, method 1300 includes operation 1302. Operation 1302 includes identifying a lower calibration target of a column of an automated tape library. A lower calibration target may be the lowermost (e.g., the bottom) calibration target of the column where there are a plurality of calibration targets in the column, in some approaches. In other approaches, a lower calibration target may be a calibration target in the lower half of the column, the lower third of the column, the lower fourth of the column, etc. It should be understood by one having ordinary skill in the art upon reading the present disclosure that "lower" refers to a lower position on a vertical axis of the column relative to an "upper" portion of the vertical axis of the column. The lower calibration target may be determined by a user, a manufacturer, default settings, etc.

The lower calibration target may be identified by a robotic accessor. The robotic accessor preferably includes a calibration sensor configured to identify calibration targets via methods known in the art. For example, the calibration sensor may include a camera device, a 2D imager, barcode scanner, etc.

Operation 1304 includes identifying an upper calibration target of the column. An upper calibration target may be the uppermost (e.g., the top) calibration target of the column where there are a plurality of calibration targets in the column, in some approaches. In other approaches, an upper calibration target may be a calibration target in the upper half of the column, the upper third of the column, the upper fourth of the column, etc. It should be understood by one having ordinary skill in the art upon reading the present disclosure that "upper" refers to an upper position on a vertical axis of the column relative to a "lower" portion of the vertical axis of the column. The upper calibration target may be determined by a user, a manufacturer, default settings, etc.

The upper calibration target may be identified by a robotic accessor. The robotic accessor preferably includes a calibration sensor configured to identify calibration targets via methods known in the art, as discussed in detail above. Preferably, the robotic accessor may be the same robotic accessor that identified the lower calibration target. The robotic accessor may be a different robotic accessor of a plurality of robotic accessors in the automated tape library as would be understood by one having ordinary skill in the art.

Operations 1302 and 1304 may be interchangeable in other approaches. For example, method 1300 may include identifying an upper calibration target and identifying a lower calibration target in any order determined by a user, a manufacturer, a default setting, etc.

Operation 1306 includes calculating at least one slot position between the upper calibration target and the lower calibration target. The calculated at least one slot position is the theoretical position of a storage slot located between the upper calibration target and the lower calibration target. In one exemplary implementation, the calculated at least one slot position is centrally located between the upper calibration target and the lower calibration target (e.g., the calculated at least one slot position is approximately evenly distributed along the vertical axis of the column between the upper calibration target and the lower calibration target).

In various approaches, a plurality of theoretical slot positions may be calculated. A plurality of slot positions may be calculated in various approaches as described in detail below. In one exemplary implementation, the plurality of calculated slot positions are evenly distributed between the upper calibration target and the lower calibration target (e.g., evenly distributed along the vertical axis of the column).

Operations 1308-1312 are performed for one or more of the calculated slot position(s). In operation 1308, an actual slot position corresponding to the calculated slot position is identified. The actual slot position is located by a robotic accessor. Preferably, the robotic accessor may be the same robotic accessor that identified the upper calibration target and/or the lower calibration target. The robotic accessor may be a different robotic accessor of a plurality of robotic accessors in the automated tape library as would be understood by one having ordinary skill in the art.

In preferred approaches, the identified actual slot position is the definitive, respective slot position of the calculated slot position. In other approaches, the identified actual slot position may be a slot position above or below the definitive, respective slot position of the calculated slot position.

In some approaches, every slot position is calculated based on the actual locations of the upper and lower calibration targets, but less than all of the corresponding actual slot positions are identified using the robotic accessor. For example, only one actual slot position may be identified (e.g., a centermost actual slot position), two actual slot positions may be identified, e.g., each about ⅓ of the distance between the upper and lower calibration targets from a respective one the upper and lower calibration targets, every fourth actual slot position, etc.

Operation 1310 includes comparing the calculated slot position to the corresponding identified actual slot position. The calculated slot position may be compared to the corresponding identified actual slot position in any manner known in the art. For example, comparing the calculated slot position to the corresponding identified actual slot position may include comparing the calculated (X, Y) position to the actual (X, Y) position, a calculated (theta, Y) position to the actual (theta, Y) position, etc.

Operation 1312 includes determining whether the calculated slot position is within a predefined range of the corresponding identified actual slot position, e.g., based on a result of the comparing operation 1310 such as difference between the calculated Y position and the actual Y position. The predefined range may be set by a user, a manufacturer, a default setting, etc. The predefined range is preferably less than or equal to 1.5 mm. In other approaches, the predefined range is less than or equal to 2 mm. The predefined range preferably refers to a range in the offset between the calculated slot position and the corresponding identified actual slot position. The predefined range may refer to an offset in an X dimension and/or in a Y dimension. For example, a calculated slot position is not within a predefined range of the corresponding identified actual slot position if the values (e.g., X and/or Y values) associated with the calculated slot position and the corresponding actual slot position differ by more than 2 mm horizontally in the X direction and/or vertically in the Y direction.

Operation 1314 includes outputting a result of the determination. In some approaches, the result of the determination confirms that the column is straight in response to determining that the calculated slot position is within the predefined range of the corresponding identified actual slot position. The result of the determination confirms that the column is not straight in response to determining that the calculated slot position is not within the predefined range of the corresponding identified actual slot position.

In alternative approaches, the result of the determination confirms that the column is straight in response to determining that the calculated slot position is not within the predefined range of the corresponding identified actual slot position and the result of the determination confirms that the column is not straight in response to determining that the calculated slot position is within the predefined range of the corresponding identified actual slot position.

In at least some embodiments, in response to receiving a result which confirms that the column is not straight, method 1300 may include calibrating each slot in order to allow the automated tape library and/or the robotic accessor to function without replacing components of the automated tape library.

As used throughout the present disclosure a "comparison," "comparison check," or "check" may refer to the calculation, comparison, and determination operations for each of the slot positions that are checked in a column to determine straightness of the respective column.

The predefined range and/or any associated parameters for column straightness may be input by a user in various approaches depending on how much time the user is willing to spend time performing the comparison check. For example, if time is of the essence and only a cursory check is requested, one additional slot position in the middle of the column may be calculated and compared to identified actual slot positions to determine column straightness. In another example, if there is a known concern that at least one component of the tape library was damaged (e.g., derived from damage to outside packaging upon delivery of the component, derived from visual inspection of the user, etc.), a plurality of slot positions in a column may be calculated and compared to identified actual slot positions to determine whether the respective column is straight. In the foregoing example, about 5 to 10 additional slot positions may be calculated and compared to identified actual slot positions within the column.

In other exemplary implementations, it may be desirable to check less slot positions at a manufacturing facility immediately following manufacturing. Ideal manufacturing processes are unlikely to result in defects and a cursory check of at least one slot position would be desirable. In contrast, it may be desirable to perform more slot position comparison checks upon delivery of automated tape library components where it is more likely that some damage occurred to the automated tape library components during shipping.

In other approaches, a user, a manufacturer, a default setting, etc., may select certain columns and/or a predetermined number of a plurality of columns in an automated tape library to perform the comparison check for straightness. A user, a manufacturer, a default setting, etc., may select a predetermined number of a plurality of slot positions within a column to check for the column's relative straightness. In one default implementation, all columns in an automated tape library are checked. Alternatively, in response to detecting a noticeable defect and/or a reported problem with a specific, defective column (e.g., a robotic accessor mishandles and/or drops a tape cartridge), only the defective column(s) may be checked for straightness. In other approaches, the number of columns which are checked for straightness and/or the number of slot positions within the column(s) is derived from user input.

In various approaches, the columns of the automated storage library are straight, and the vertical mast of the robotic accessor is not straight. It may be inferred that the vertical mast of the robotic accessor is not straight in response to determining that each column in an automated tape library is not straight and/or determined to have the same offset. For example, if all of the columns in the automated tape library are determined to be not straight and have an offset of 1.8 mm, the robotic accessor may be determined to be not straight rather than determining that all of the columns are not straight. Alternatively, if all of the columns in the automated tape library are determined to be straight except for one, the one column is not straight.

It should be understood by one having ordinary skill in the art that the various embodiments of the present disclosure may be adapted for use in round automated tape library. For example, method 1300 may be modified to calculate and compare theta dimensions (e.g., angular dimensions) of the slot position(s) horizontally instead of the X dimension of the slot position(s) horizontally.

In exemplary implementations, the comparison check according to at least some of the operations described above may be used to check for automated library component straightness (e.g., straightness of column(s) in the automated tape library, the robotic accessor, the storage door, the frame, etc.). In response to determining at least one component of the automated tape library is not straight, method 1300 may include outputting a recommendation to replace the component(s), e.g., as a result of the determination made in operation 1314. In other approaches, in response to determining at least one component of the automated tape library is not straight, method 1300 may include reconfiguring the robotic accessor to account for the at least one component that is not straight.

It should be understood by one having ordinary skill in the art that various embodiments of the robotic accessor column straightness confirmation as described herein may be adapted for use in other data storage libraries in addition to the exemplary implementation in automated tape libraries discussed in detail above. It would be beneficial to check for column straightness in various data storage libraries which use robotic accessors to move data storage cartridges throughout the data storage libraries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a lower calibration target of a column of an automated tape library;
identifying an upper calibration target of the column;
calculating at least one slot position between the upper calibration target and the lower calibration target;
for at least some of the at least one calculated slot position(s), performing a check comprising:
identifying an actual slot position corresponding to the calculated slot position, wherein the actual slot position is located by a robotic accessor,
comparing the calculated slot position to the corresponding identified actual slot position, and
determining whether the calculated slot position is within a predefined range of the corresponding identified actual slot position; and
outputting a result of the determination.

2. The method as recited in claim 1, wherein the result confirms that the column is straight.

3. The method as recited in claim 1, wherein the result confirms that the column is not straight.

4. The method as recited in claim 1, wherein the check is performed in a field of operation of the automated tape library.

5. The method as recited in claim 1, wherein the check is performed upon delivery of the automated tape library.

6. The method as recited in claim 1, wherein the check is performed at a manufacturing facility associated with the automated tape library.

7. The method as recited in claim 1, wherein the check is performed for all columns in the automated tape library.

8. The method as recited in claim 1, wherein the check is performed on a predetermined number of columns in the automated tape library.

9. The method as recited in claim 1, wherein a number of calculated slot position is derived from user input.

10. A system, comprising:
- a processor; and
- logic integrated with the processor, executable by the processor, or integrated with and executable by the processor, the logic being configured to:
- identify a lower calibration target of a column of an automated tape library;
- identify an upper calibration target of the column;
- calculate at least one slot position between the upper calibration target and the lower calibration target;
  - for at least some of the at least one calculated slot position(s), the logic is configured to perform a check comprising:
    - identify an actual slot position corresponding to the calculated slot position, wherein the actual slot position is located by a robotic accessor,
    - compare the calculated slot position to the corresponding identified actual slot position, and
    - determine whether the calculated slot position is within a predefined range of the corresponding identified actual slot position; and
- output a result of the determination.

11. The system as recited in claim 10, wherein the result confirms that the column is straight.

12. The system as recited in claim 10, wherein the result confirms that the column is not straight.

13. The system as recited in claim 10, wherein the check is performed in a field of operation of the automated tape library.

14. The system as recited in claim 10, wherein the check is performed upon delivery of the automated tape library.

15. The system as recited in claim 10, wherein the check is performed at a manufacturing facility associated with the automated tape library.

16. The system as recited in claim 10, wherein the check is performed for all columns in the automated tape library.

17. The system as recited in claim 10, wherein the check is performed on a predetermined number of columns in the automated tape library.

18. A computer program product, the computer program product comprising:
- one or more computer readable storage media, and program instructions collectively stored on the one or more computer readable storage media, the program instructions comprising:
- program instructions to identify a lower calibration target of a column of an automated tape library;
- program instructions to identify an upper calibration target of the column;
- program instructions to calculate at least one slot position between the upper calibration target and the lower calibration target;
  - for at least some of the at least one calculated slot position(s), perform a check comprising:
    - program instructions to identify an actual slot position corresponding to the calculated slot position, wherein the actual slot position is located by a robotic accessor,
    - program instructions to compare the calculated slot position to the corresponding identified actual slot position, and
    - program instructions to determine whether the calculated slot position is within a predefined range of the corresponding identified actual slot position; and
- program instructions to output a result of the determination.

19. The computer program product as recited in claim 18, wherein the result confirms that the column is straight.

20. The computer program product as recited in claim 18, wherein the result confirms that the column is not straight.

* * * * *